Figure 1:
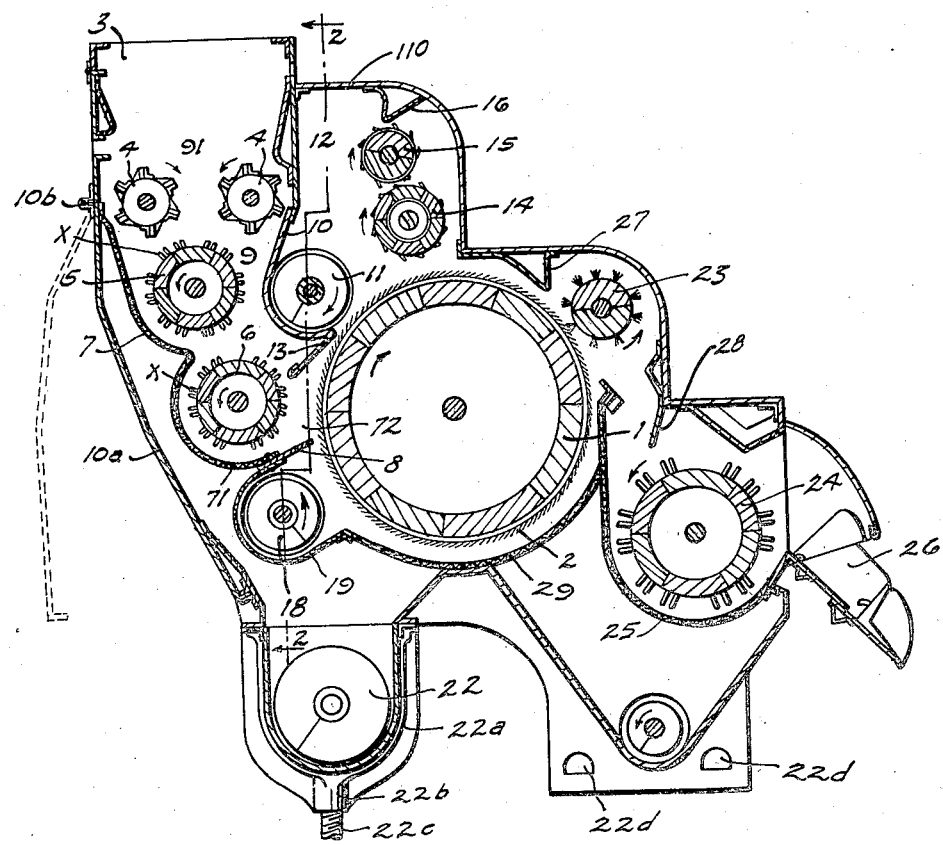

Feb. 25, 1936. J. BLEWETT 2,031,587
MACHINE FOR CLEANING SEED COTTON AND FOR EXTRACTING
THE SEED COTTON FROM BURRS AND HULLS
Filed Aug. 10, 1931 2 Sheets-Sheet 2
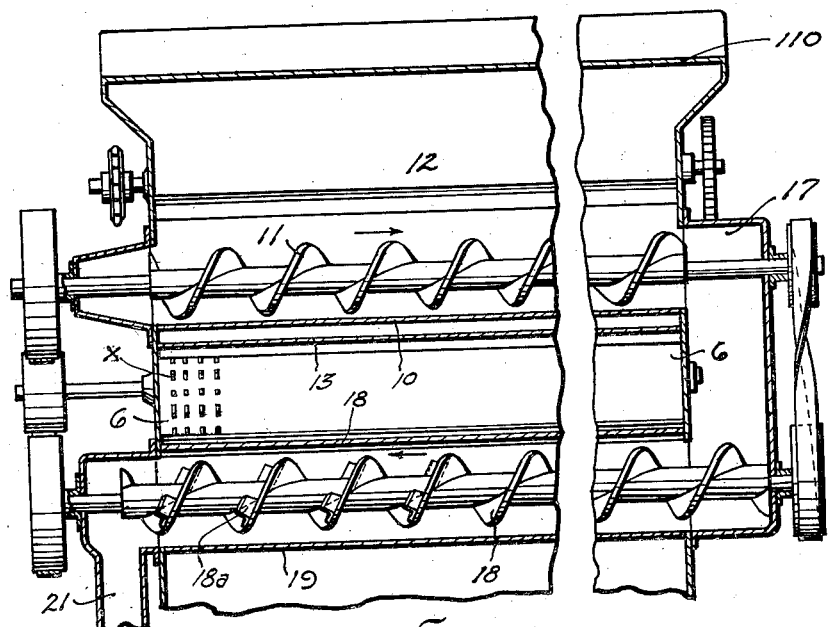
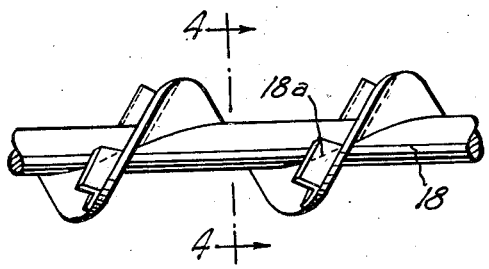
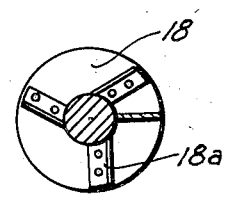
Inventor
John Blewett
By Jack A. Schley
Attorney Patented Feb. 25, 1936

2,031,587

UNITED STATES PATENT OFFICE 2,031,587

MACHINE FOR CLEANING SEED COTTON AND FOR EXTRACTING THE SEED COTTON FROM BURRS AND HULLS

John Blewett, Dallas, Tex., assignor to The Murray Company, Dallas, Tex., a corporation of Texas Application August 10, 1931, Serial No. 556,129

1 Claim. (Cl. 19—37)

This invention relates to new and useful improvements in machines for cleaning seed cotton and for extracting the seed cotton from burrs and hulls.

One object of the invention is to provide certain improvements in the mechanism shown in my Letters Patent issued October 9, 1934, No. 1,976,382, whereby more advantageous results are had.

A further object of the invention is to simplify the structure set forth in my co-pending application, by using a single by-pass instead of two by-passes and by substituting a single direction conveyor for a double direction conveyor.

Another object of the invention is to provide a screw conveyor for the conveyor roller of my former structure, thus making for more positive feeding as well as for simplicity.

An important object of the invention is to provide a screw conveyor for a cotton hull extractor, which conveyor is provided with flight lugs or wings at its discharge end portion for agitating the cotton and increasing the moving capacity of the conveyor as well as breaking up lumps of cotton, all with less tendency to shale the cotton.

A construction designed to carry out the invention will be hereinafter described together with other features of the invention.

The invention will be more readily understood from a reading of the following specification and by reference to the accompanying drawings in which an example of the invention is shown, and wherein:

Figure 1 is a partial transverse vertical sectional view of a machine constructed in accordance with the invention, Figure 2 is a longitudinal vertical sectional view of the same, Figure 3 is a detail of the lower conveyor, and Figure 4 is a transverse sectional view taken on the line 4—4 of Figure 3.

Cotton hullers and cleaners of the general type to which the invention relates embody an extracting drum as the principal working element, with the coacting elements arranged around it to separate and beat out trash, dirt and dust, while feeding to the drum the seed cotton which is to be cleaned, removing it from the extracting drum, and delivering the cleaned seed cotton into a gin or other desired place.

Although the machine illustrated is intended especially for use over a gin, as is indicated in the drawings, it may obviously be made in various sizes and arranged to deliver as desired, for example, to a cotton conveyor. The frame and casing which enclose and support the various elements making up my machine may be of wood or metal and will naturally be so designed as to provide bearings for the various shafts controlling the moving parts.

Referring to Figure 1 of the drawings the various elements are clearly shown as they are arranged with regard to drum 1 and to each other. The cotton to be cleaned of its burrs, hulls and trash is fed into the hopper 3, in the bottom of which are the usual feed rollers 4.

Beneath the feed rollers 4 I prefer to arrange two picker or beater rolls 5, 6, one over the other, these rolls being provided on their surfaces with projecting spikes or pins $x$ for the purpose of engaging and actuating the seed cotton in the operation of the machine. Opposed to these beater rolls 5, 6, is the foraminous wall 7 of a sinuous chute. This wall is preferably bent to follow the contour of the rolls 5, 6, and is adapted to sustain and guide the seed cotton in proximity to the beater rolls. The space between the wall 7 and the beater rolls constitutes the downward sinuous chute, down which the material passes by gravity, assisted by the pins $x$, which engage and drag it over the foraminous sinuosities, and thus tend to disintegrate any seed masses or lumps, open bolls, loosen trash, and shake out dust and dirt.

The chute 7 ends at a floor 11 which is a continuation of the foraminous plate around under the lower beater 6, and is more or less horizontal; and there it delivers the material through a vertical side opening 12 against the cotton seizing surface of the drum element 1. The edge part 8 of this floor, next to the drum, is flexible and elastic, being made, for example, of a somewhat stiff sheet of rubber. For this purpose a piece of rubber belting serves very well. This flexible edge stands close to the teeth 2 of drum 1, and is stiff enough to prevent escape of material from the chute floor downward, but is capable of yielding upward to permit other material, as seeds or hulls carried on the drum 1, to pass freely upward from the part of the machine which is below. That side of the lower beater roll 6 which is toward the drum 1 is moving upward, as is the adjacent surface of the drum; and all material that reaches the floor 11 is by this means fed to and forced against and into the teeth of the drum; but just where the rotating beater pins $x$ begin to move away from the drum 1 is a fixed stiff plate 13, projecting down obliquely toward them from the side on which the drum is, preventing material from continuing around with the beater pins, and guiding it to follow the teeth of the drum 1.

The beater rolls 5, 6, it will be observed, are set in a sinuous descending chamber 9 whose upper end 91 is at the feed rolls 4, and whose lower end is closed by the foraminous floor 71, the drum 1 and the stiff plate 13; while its sides are formed, one by the foraminous wall 7 of the chute and the other by the sheet metal wall 10 of an upper intermediate chamber 12 which lies between it and the upper part of the drum. The bottom of this wall 10 is curved toward the drum 1 so as to make one half or side of a trough, whose other side is missing except as it is formed by the adjacent convex side of the drum or of any masses of cotton which may be thereon. A single left hand screw conveyor 11 is mounted in said trough so as to move the cotton toward one end.

The lower edge of the half 10 of the trough extends toward said upper part of the drum 1, and is rather close to it, although leaving room for seed cotton, with more or less burrs attached, to be carried up by it on the surface of the drum. From this edge, said sheet metal 13 extends stiffly downward and a little away from the drum toward the lower beater 6, and serves a triple function. It constitutes a closure for the chamber 9, to compel material therein above the picker 6 to pass around with that picker over the lower part of the wall 7; it prevents material below it in the chamber 9 from being carried up and around by the spiked roller or picker 6, and clears it from that picker; and it constitutes, in cooperation with the surface of the drum, a sort of contracting throat, by which the grip of the drum on cotton moving into the throat may be made more secure. As it is a continuous plate, parallel to the drum, some of the bolls or masses that may have passed intact the earlier, spiked or wider spaced elements may be crushed as they pass, or may be broken and a part pushed back while the part more securely held by the drum is carried on.

It is a feature of my improved machine that ready access may be had to the interior when desired. To this end one side section of casing 110, indicated at 10a, is hinged at 10b and can be swung outward as indicated in dotted lines in Figure 1. The side section 10a has its hinge at its upper end, and may be locked by any suitable securing means at its lower end.

The intermediate chamber 12 is the main place for the separation of burrs from the drum, whose surface, preferably of card cloth, is engaged with the lint. The knocker 14, rotating so that the adjacent surfaces of roll 14 and drum 1 travel oppositely, acts as a percussion element to engage all lumps carried on the drum and beat them off into trough 19. I prefer to mount another knocking roll 15 above the roll 14, rotating in the same direction as roll 14 and positioned to clear it by knocking off any hulls and cotton which may have adhered to it. And a fixed barrier plate 16 above the upper knocker roll 15 completes the perfection of clearing, by preventing the latter roll from carrying around any substantial amount of the material.

All kinds of material loose enough to be separable from drum 1 will fall into trough 10, where the conveyor 11 promptly moves the greater part of it away from the drum 1 and keeps it separated therefrom. This includes burrs, hulls, trash, etc. and occasional bunches or wads of cotton. Of the latter, such large wads as land on the blades of the slowly rotating conveyor may fall back against the drum; and if these happen to strike a place where the card teeth are not already filled with cotton they will be immediately again carried up against the knocker 14, and perhaps then be carried past the knocker or be broken into smaller locks.

By having the two stripper rolls, 14 and 15, rotating in the same direction and one above the other, and especially with the closely set barrier 16 above the roller 15, the loose hulls and cotton can be practically separated by this agitating in chamber 12,—the top knocker or stripper roller 15 keeping the hulls from passing over the top of the knocker 14; and the baffle 16 serving the same purpose for the roller 15. But, owing to the small diameter of the core of the conveyor, the separated burrs and hulls and the smaller material beaten back from 14 will fall into the lower part or floor of the trough, where the blades of conveyor 11 are moving under toward the back of the trough, away from the drum. Such material therefore is kept away from the drum while being conveyed along the trough to the outside of the machine.

The material which is conducted along the trough 10 is discharged at the right hand end (Figure 2) into a vertical bypass chute 17 mounted on the outside of the casing and leading to a lower level where another screw conveyor 18, operating in a foraminous trough 19 conducts it back within the casing 110. The use of a single upper conveyor conducting the material in one direction only is made possible by the structure of the lower conveyor 18.

The lower conveyor 18 is driven in the opposite direction from the conveyor 11 and extends into the bottom of the chute to carry the material into the trough. The conveyor 18 also is a left hand conveyor (Figure 2) and conducts the material from the end of trough 19 into a discharge chute 21 which is at the right hand side of the machine. A portion of the conveyor 18 has lugs or wings 18a upset from its flights or secured thereto, as is shown in Figures 3 and 4. These lugs stir up or agitate the cotton during the latter part of its travel through the trough 19, whereby it is more effectively acted upon by the drum 1 and all lumps are disintegrated. These lugs also act to cast the material against the drum independently of the flights.

Burrs, hulls and other waste material, as soon as they are once separated from the cotton on drum 1 by the knocker 14, are thus in general maintained separate and apart from the main feed of cotton on which the machine is working. But some lint is among them and there may be among them some unbroken masses. If the mass is large enough it may catch on the drum 1, to which one open side of the trough is exposed. But all material which becomes fully under influence of the conveyor 11 is kept away from drum 1 at that place, and passes down to conveyor 18, which latter rotates in direction tending to push material against the drum. Therefore in the course of its travel along 18, any remaining lint will be caught by the teeth of the drum, which at this point in its rotation will be empty, and will be carried upward, passing the chute floor 71 by the yielding of the elastic edge 8. The hulls and dirt which have not enough lint to be thus carried up continue along the trough to the end discharge chute 21 and thence are carried out of the machine by the conveyor 22.

The seed cotton, carried by the drum past knocker roll 14, continues on the drum until, at a point beyond the chamber 12, it is cleared from the drum by means of a doffer roll 23, or the like, moving faster than the teeth of the drum are moving. And in its course to the doffer roll, the seed cotton passes a barrier 27 which is designed to serve as a shield to prevent the air currents, set up by the swiftly rotating doffer, from blowing material from the drum and back into the passage through which it came. Also I prefer to form the barrier 27 with its face which is toward the drum arcuate in shape to further minimize any clogging tendency in this region.

The doffer 23 throws the cotton, for final cleaning, upon a picker cylinder 24 below, whose belt drives it slowly in comparison with the speed of said doffer. And a stripping barrier 28 acts to dislodge and prevents material being carried around on the doffer. This barrier element also has an arcuate under face which tends to prevent packing and clogging at the outlet from the doffer chamber. An iron screen or other foraminous wall 25 is associated with cylinder 24, and the cotton is swept and rolled along the wall 25 slowly enough for dust and dirt to sift through the screen. The completely cleaned product is thus swept by the cylinder 24 into a discharge chute 26 which in turn may deliver into the breast of a gin; into a cotton conveyor; or to any other desired mechanism or place.

Both of the barriers 27, 28, are substantially V-shape in cross-section, and made of stiff sheet metal. And each constitutes a guide for the lint cotton and for currents of air generated by the doffer 23. In conjunction with that portion of the doffer which is toward the drum and that portion of the drum which is toward the doffing chamber, the barriers 27, 28 provide an approximately straight tangential passage for the doffed material, and for the air currents, leading to the cleaning chamber below.

The carrying-off conveyor 22 may serve for a plurality of machines, it extending longitudinally underneath the main casing 110, at a rear location, with its trough open upward at the place where it receives dirt, trash and waste matter from a particular machine. It is supported in proper working relation to casing 110 by means of the brackets 22a, in the form of yokes, which engage around the trough with their ends serving as supports for the casing 110 above. Each yoke bracket 22a has a socket 22b, and a post 22c, upstanding from the floor, engages in the socket and is adjustable therein to vary the elevation of the bracket 22a and the conveyor 22 and casing 110 above. The front end of casing 110 has the supporting elements 22d which are adapted to rest on a gin or other supporting structure.

Practically all of the seed cotton carried on the drum 1 past the knocker 14 will be doffed in the manner above described and will pass on out of the machine. Some little however may be held so tightly by the teeth of the drum as to fail of being doffed. I provide for reclaiming this in the course of further rotation of the drum. To this end there is provided a reclaiming screen 29 around the under side of the drum and extending from the upper portion of the screen wall 25 to a point adjacent to the lower conveyor trough 19. The narrow space between drum 1 and the screen constitutes a passage for material to be carried past the reclaiming screen 29, with more or less incidental agitation and loosening. Thus loosened, and minus dust and dirt which may have sifted through screen 29, it continues on the drum, or is thrown by the conveyor 18 against the drum, to be carried again to doffer 23, this time to be doffed for final cleaning and passage out of the machine.

From the foregoing description it will be seen that my machine gives selective re-treatment, or what may be called duplex separating and cleaning, to such separated burrs, hulls and trash as have lint attached; but that which is to receive duplex treatment is first separated from the main body of the material being handled; that only the lint-bearing portion of it goes over the drum a second time; and that this portion gets its further treatment by being applied to a fresh, empty part of the drum. The bulk of seed cotton extracted by drum 1 is conducted directly through the machine. Thus the efficiency is enhanced, as compared with those machines in which the knocker throws the burrs and trash back into the stream of material which is being presented to the surface of the drum, increasing the proportion of burrs therein and occupying space that in the present machine can be used by fresh material. This latter feature is another which tends to make it possible to get a larger output with a machine of given size.

Cooperating to make a perfect product, from lint material which thus is not presented repeatedly to the drum, are devices which, without delaying the progress of the cotton through the machine, give it extra preliminary and final cleaning. The beater rolls 5, 6, in a sinuous foraminous chute give duplex action on the incoming material to separate small loose particles. And fragments broken but not knocked off by the knocker 14 have superior opportunity to escape in moving slowly over the curved screen 25, with plenty of time for the small particles to work through. The slowness is attained by making the picker 24 separate from the doffer 23; and thoroughness is gained by making the course of this screen 25 lie through a curve downward, then laterally, then upward to the place where the cleaned seed cotton is delivered from the machine.

While the lint engaging element is illustrated, and, for brevity, is described and mentioned in the claims as being a drum, it is recognized that its function may be served by other devices which are known as substantial equivalents.

Various changes in the size and shape of the different parts, as well as modifications and alterations, may be made within the scope of the appended claim.

Having illustrated and described a preferred form of the invention, what I claim is:

A cotton seed cleaning and extracting machine including, a lint engaging drum, a knocker for removing separable material from said drum, a transverse trough extending longitudinally of said drum entirely thereacross and located in position to remove matter knocked off the drum by said knocker, said trough being open to the drum along one side, a conveyor in said trough, said trough being closed at one end and open at its opposite end, said conveyor being arranged to convey matter to the open end of said trough, a second trough below the first trough having a connection with the first trough beyond the end of the drum for receiving material discharged from said first trough, the second trough being open to the drum along one side and having a discharge at its end opposite its receiving end, and a second conveyor in the second trough extending longitudinally of the drum and beyond the ends thereof for moving material longitudinally of said second trough continuing across the face of said drum from the receiving end to the discharge end of the said second trough, the second conveyor having the flights adjacent the receiving end of the second trough smooth for distributing the conveyed matter along the trough without choking and the subsequent flights provided with means for independently casting the conveyed matter into contact with the drum and for breaking up lengths of material.

JOHN BLEWETT.